L. A. SPRAGUE.

Buckles.

No. 4,759. Reissued Feb. 13, 1872.

Witnesses.

Chas. B. Nottingham

Thomas C. Smith

Charles Goodyear jr
assignee of
Leonard A. Sprague Inventor.
by his attorney
A Wallace

UNITED STATES PATENT OFFICE.

LEONARD A. SPRAGUE, OF BROOKLYN, ASSIGNOR TO CHARLES GOODYEAR, JR., OF NEW YORK CITY, N. Y.

IMPROVEMENT IN BUCKLES.

Specification forming part of Letters Patent No. 35,401, dated May 27, 1862; reissue No. 4,759, dated February 13, 1872.

*To whom it may concern:*

Be it known that LEONARD A. SPRAGUE, of Brooklyn, Kings county, in the State of New York, has invented certain new and useful Improvements in Buckles, of which the following is a specification:

This invention has for its object certain improvements in the construction of the tongue of the buckle, and also certain improvements in the mode of connecting the buckle with the strap with which it is used.

So far as concerns the tongue, the invention consists in constructing it of a strip or plate of metal folded back upon itself or doubled, and inclosing the axis of the frame upon which the tongue is designed to work, substantially as hereinafter set forth; this construction being applicable to what are known as lever or pinching buckles—that is to say, buckles which hold the part of the strap passed through them by pinching or griping it.

The improvement in the mode of connecting the buckle with the strap is particularly applicable to that class of buckles in which the frame is provided with a transverse axis located between its two ends, and carrying the tongue under such an arrangement that, while the one part of the frame will form a bearing to support the free end of the tongue in holding the strap, the opposite end of the frame on the other side of the axis will form a loop, through which the end of the strap held by the tongue may be passed.

The improvement consists in attaching the buckle to the strap by means of a metallic link, composed of a strip or plate of metal bent around the axis on which the tongue turns, and embracing the end of the strap between its ends, which are fastened together by rivets or pins passing through them and through the parts of the strap intermediate between them. In this way the connection is made very firm and secure, and the loop-end of the buckle, or the end under which the free end of the strap is tucked, is not filled up as it would be were the strap itself to pass around the axis, the tucking under of the free end of the strap being in such cases a matter of some difficulty. Besides this, the mode of connection specified gives a neat and ornamental finish to the joint between the buckle and strap.

In the accompanying drawing in illustration of this invention is shown a buckle in which both of the above features are represented.

Figure 1:
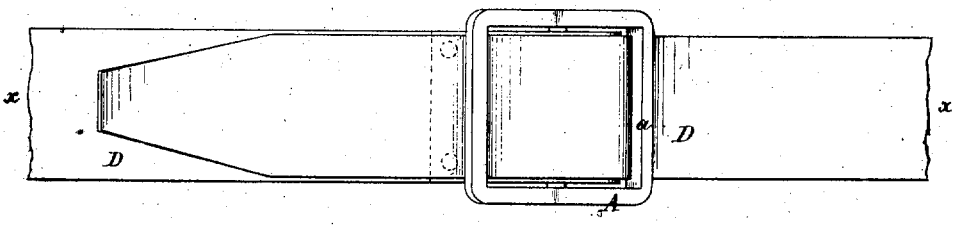
Figure 2:
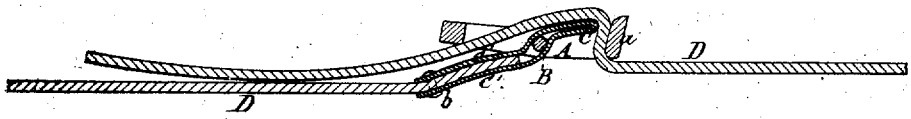
Figure 3:
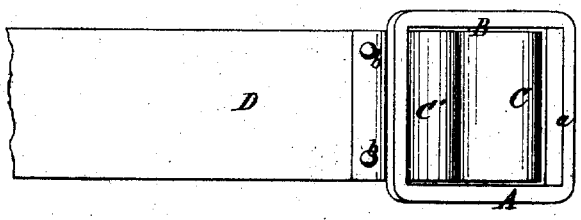

Figure 1 is a plan view of the buckle with the ends of the strap. Fig. 2 is a longitudinal section of the same on the line *x x*, Fig. 1. Fig. 3 is a plan view of the buckle with the free end of the strap removed therefrom.

A represents the frame of the buckle, which may be of rectangular or other form. B is the transverse pin or axis upon which the tongue is designed to turn; this pin or axis may be made separately and then secured in the frame, or made with the frame in one piece. It is located about midway between and parallel with the ends of the frame. The connection of the buckle with the strap D is effected by means of a metallic link, C′, composed of a strip of metal passing loosely around the axis B and then doubled back, so as to embrace between its two ends the end of the strap, the parts being held together by rivets *b* passing through the ends of the metallic strip and the intermediate strap, as shown. In this way a firm and secure connection is effected, and the space between the axis *b* and the rear end of the frame, through which the free end of the strap is intended to be tucked, is not filled up as it would were the strap D to be passed around the axis, and then folded back on itself. As before stated, the tongue of the buckle is also loosely mounted on the axis B so as to be capable of turning thereon. In order, however, to carry out the first part of the improvement above mentioned, I make the lever or tongue of the buckle in one piece with the link C′. In other words, I form the tongue by continuing the fold of the strip which forms the link for a proper distance in front of the axis, as shown at C this folded portion being formed and shaped and soldered or held together so as to form a tongue, as seen plainly in Fig. 2. The tongue in this case, as it is intended for a lever or pinching buckle, is about as wide as the frame. The front end of the tongue nearly touches the front part *a* of the frame, and this portion of the tongue may be milled or corrugated, if necessary, in order to obtain a firm bite or gripe on the strap introduced between it and the part *a* of the buckle. The frame A, in rear of the axis B, is bent upward, so as to form a loop, through which the free end of the strap D can conveniently be passed, and the front *a* of the frame is slightly inclined or beveled, as shown more particularly in Fig. 2, in order to form a better bearing for the strap when the latter is pinched by the tongue. The free end of the strap when drawn, under tension or a resistance force, through the frame A, between its front part or end *a* and the front end of the lever C, will be firmly pinched and held in position by said lever under the tension of the strap. The greater the force which acts upon the strap to distend its ends, the firmer the pinch or hold will be.

What is claimed as the invention of LEONARD A. SPRAGUE is—

1. The attachment of buckles to straps substantially in the manner herein described—that is to say, by means of a metallic strip or plate bent around the axis of the buckle-frame, on which the tongue works, and embracing between its ends the end of the strap, the two being fastened or clinched together by rivets or their equivalent, substantially as shown and set forth.

2. The tongue of a pinching buckle, constructed of a strip or plate of metal folded back upon itself or doubled, and inclosing the axis of the frame upon which the tongue turns or works, as herein set forth.

In testimony whereof I have signed my name to this specification before two subscribing witnesses.

Witnesses: CHAS. GOODYEAR, JR.
CHAS. T. DE FOREST,
GOWEN H. CRAGG.